3,534,072
PROCESS FOR THE MANUFACTURE OF 3-METHOXY-1,3,5(10),6,8-ESTRAPENTAENE-17-ONE
Reinhold Wieske and Gregor Hain, Berlin, Germany, assignors to Schering Aktiengesellschaft, Berlin, Germany
No Drawing. Filed July 23, 1968, Ser. No. 746,734
Claims priority, application Germany, July 26, 1967, 1,643,032
Int. Cl. C07c 167/14
U.S. Cl. 260—397.45          4 Claims

ABSTRACT OF THE DISCLOSURE

Process for preparing 3-methoxy-1,3,5(10),6,8-estrapentaene-17-one comprising brominating the corresponding 6,7-dihydrosteroid and splitting off hydrogen bromide from the brominated product thereby formed.

---

This invention relates to a process for the preparation of 3-methoxy-1,3,5(10)6,8 - estrapentaene-17-one (equilenin-methylether). More particularly this invention relates to a process for the preparation of 3-methoxy-1,3,5(10)6,8-estrapentaene-17-one by the reaction of the corresponding 6,7-dihydro-steroid with bromine followed by splitting off of hydrogen bromide from the brominated product thereby formed.

Equilenin-methylether constitutes an important starting steroid for use in the manufacture of pharmaceutically effective steroid materials. Still further equilenin-methylether is an important therapeutic agent being used per se in combination with estrone, i.e., therapeutic compositions containing both equilenin-methylether and estrone are administered for replacement therapy in estrogen deficiency. The compositions are also employed in suppression of lactation, prophylaxis and treatment of mumps, orchitis, etc.

A number of processes have been proposed for preparing equilenin-methylether. These include for example dehydration of 6-dehydro-estrone with selenium dioxide (Kaufman, J. Am. Chem. Soc. 72 (1950) 4531); treatment of the corresponding 9,11-dichloro-1,4-3-ketosteroid (Heller, J. Am. Chem. Soc. 86 (1964) 2309); bromination of 9(11)-dehydro estrone-methylether followed by splitting off of hydrogen bromide (Tsuda, Chem. Pharm. Bull. 11 (1963) 1022); and dehydration of 8(9)-dehydro-estrone-methylether with selenium dioxide (Douglas, J. Chem. Soc. London/1963/5072). However, all of the aforesaid processes are not suitable for technical production of equilenin-methylether because of the low yields which are obtained and which heretofore have amounted to a maximum of 20% of theory. In addition, there is a further disadvantage in that in the purification of the crude material obtained by the known processes and which is required for the separation of the various by-products is very expensive due to the structural similarity of the desired 3-methoxy-1,3,5(10),6,8-estrapentaene-17-one and the by-products produced in the process and tremendous losses in yield have to be accepted as a result.

In accordance with the invention, it has now been found that if as starting material there is employed 8(9)-dehydro-estrone-methylether which can be prepared for instance according to the procedure of Gibian (Tetrahedron Let. 1966 2321) and which has thereafter been subjected to oxidation, the above set out difficulties and disadvantages are avoided. In accordance with the invention 3-methoxy-1,3,5(10),6,8 - estrapentaene-17-one (equilenin-methylether) is prepared in an economically feasible manner (50% of theory) by reacting 8(9)-dehydro-estrone methylether with bromine and thereafter splitting off hydrogen bromide from the brominated product. The practicality of the process according to the invention is extremely surprising as it was entirely unexpected that by the reaction of estrone-methylether with bromine, a dehydration could be accomplished in the B-ring. Slaunwithe (J. Org. Chem. 27 (1962) 1749) had found that it was possible under similar conditions to only achieve bromination of estrone or estradiol in the A-ring.

The process according to the invention is conducted preferably at low reaction temperatures, as for instance in the range of about 0° C. to room temperature and in the presence of a solvent as conventionally used in bromination reactions. Instances of suitable solvents include carbon disulfide and tetrachlorinated hydrocarbon. The splitting off of the hydrogen bromide takes place in this reaction medium without the addition of any other further materials as heretofore been conventionally employed.

The following examples are given for the purpose of illustrating the invention and are in no wise to be construed in limitation thereof.

EXAMPLE 1

A solution of 6 g. $\Delta^8$-dehydroestrone-methylether in 800 ml. tetrachlorinated hydrocarbon was cooled down to 0° C. Under stirring and further ice cooling, a solution of 1.1 ml. bromine in 400 ml. tetrachlorinated hydrocarbon (1.1 mol equivalent) was added dropwise to the steroid solution over a 10 minute period.

The splitting off of the hydrogen bromide started approximately 10 minutes following the addition of the bromine solution and was completed under stirring and at a temperature of 0° C. after 5 hours. No free bromine could be detected after this time. The reaction solution was washed till neutral with water, dried over sodium sulfate and concentrated in vacuo to dryness at a bath temperature of, at the maximum, 45° C.

The thusly obtained crude product was recrystallized from ether. There were obtained 3 g. (50% of theory) of pure equilenin-methylether having a melting point of 195–197° C., a rotation of $(\alpha)_D^{20} = +68°$ (CHCl$_3$) and which was established by IR and UV spectroscopy to be identical with the standard.

EXAMPLE 2

Over a 5 minute period, 0.295 ml. bromine in 100 ml. carbon disulfide were added in dropwise fashion to a solution of 1.5 g. $\Delta^8$-dehydro-estrone-methylether in 200 ml. carbon disulfide at a temperature of 5° C. As soon as the bromine was added, a strong hydrogen bromide evolvement took place. The reaction mixture was stirred for a further 3 hours at 5° C. After this time, all hydrogen bromide evolvment had subsided and free bromine could no longer be detected. The reaction solution was washed to neutrality with water, dried over sodium sulfate and concentrated in vacuum to dryness at a bath temperature of 30° C.

The residue was recrystallized from ether. There were recovered 0.77 g. (51.7% of theory) of equilenin methylether having a melting point of 194°–196° C.

EXAMPLE 3

1.5 g. $\Delta^8$-dehydro-estrone methylether were dissolved in 200 ml. methylene chloride and added at 25° C. to 0.27 ml. bromine in 100 ml. methylene chloride. After 1 hour, the solution no longer contained any free bromine. The splitting off of hydrogen bromide was completed after about 3 hours.

Thereafter, the reaction solution was washed with water, dried over sodium sulfate, brought to dryness under vacuum. Following recrystallization from ether, the yield amounted to 0.435 g. (29.2% of theory) of equilenin methylether having a melting point of 193–196° C.

The equilenium methyl ether can be administered in compositions containing estrone. The equilenin methyl ether can be present in amounts of from 10 to 90% of the total composition. The compositions can be administered orally in doses of 0.2 to 10 mg. (the estrone being present in amounts of from 0.1 to 0.5 mg.); sublingually in amounts of 0.1 to 10 mg. (estrone 0.05 to 8 mg.); intramuscularly 0.1 to 5 mg. (10 to 90% estrone); as pellet implantation, 10 to 75 mg. (10 to 90% estrone).

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Process for the preparation of 3-methoxy-1,3,5(10),6,8-estrapentaene-17-one which comprises reacting 3-methoxy-1,3,5(10),8-estratetraene-17-one with bromine at about 0 to 30° C. in the presence of a solvent selected from the group consisting of halogenated hydrocarbons and carbondisulfide for a time sufficient to form hydrogen bromide and the desired estrapentaene and eliminating hydrogen bromide from the resulting compound.

2. Process according to claim 1 which comprises carrying out said reaction in the presence of a solvent.

3. Process according to claim 2 wherein said solvent is a member selected from the group consisting of carbon tetrachloride, methylene chloride and carbondisulfide.

4. Process according to claim 1 which comprises carrying out said reaction at a temperature of from 0° C. to 30° C.

References Cited

"J. Org. Chem." by Schwenk et al. (1963), pp. 136–140.

ELBERT L. ROBERTS, Primary Examiner